July 2, 1946.　　　W. C. HEATH　　　2,403,076
ELECTRIC FLASH WELDING
Filed April 2, 1943
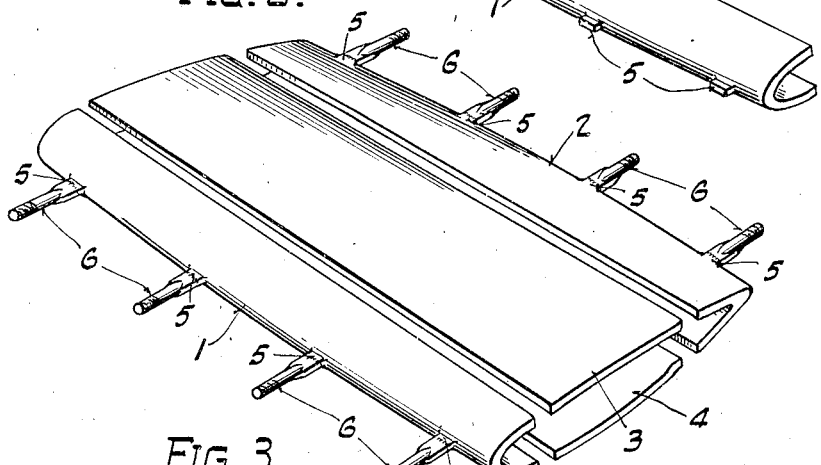
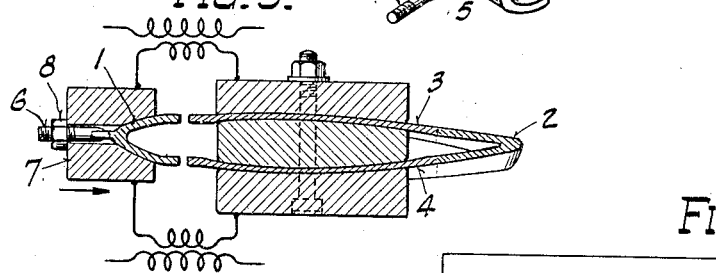
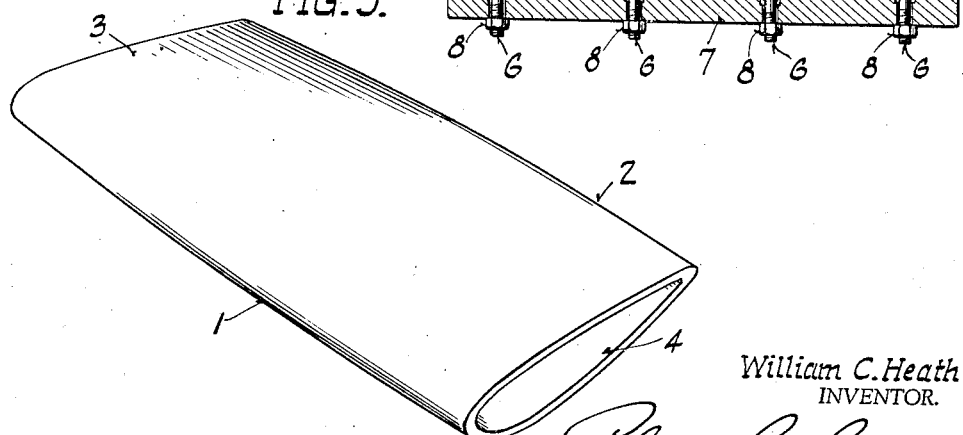
William C. Heath
INVENTOR.
BY
ATTORNEY.

Patented July 2, 1946

2,403,076

UNITED STATES PATENT OFFICE 2,403,076

ELECTRIC FLASH WELDING

William C. Heath, Shorewood, Wis., assignor to A. O. Smith Corporation, Milwaukee, Wis., a corporation of New York Application April 2, 1943, Serial No. 481,571

3 Claims. (Cl. 219—10)

This invention relates to electric flash welding and more specifically to the flash welding of leading and trailing edges to the foils of airplane propellers.

In constructing a flash-welded propeller blade as set forth in the copending application of the present inventor, Serial No. 480,682, filed March 26, 1943, for Electrically welded hollow steel propeller blade and method of making the same, a problem arises in holding the parts during welding. In this operation the forged edge strips are of V-cross section and their edges are to be welded to the respective longitudinal edges of the foils. The flash welding electrode employed to hold an edge strip has a V-shaped recess therein for receiving the strip. During the welding operation the heating of the edges of the strip by the flashing arc causes the edges to expand longitudinally and thereby tends to warp the strip out of shape prior to the application of the final welding pressure.

The principal object of the present invention is to prevent warping of the edge strip during welding and to thereby obtain a more satisfactory weld for the purpose.

In carrying out the invention, the edge strip is forged with temporary lugs along its back, to which are secured extensions which pass through openings in the back of the welding electrode and provide means for holding the strip at all times secure in the recess of the electrode. After the welding operations, the lugs are removed and the surfaces of the strip ground smooth.

The invention is illustrated in the accompanying drawing in which the views are as follows:

Figure 1 is a perspective view of a leading edge member with the projections referred to forged therein;

Fig. 2 is a similar view showing the leading and trailing edge members with their extensions secured to the projections, and the foils;

Fig. 3 is a transverse section through the parts and the welding dies just prior to welding of the leading edge to the foils;

Fig. 4 is a longitudinal horizontal section of the welding die showing a leading edge member secured therein; and Fig. 5 is a perspective view of the central section of a propeller blade after welding and the removal of the projections and flash.

In the manufacture of the central section of a hollow steel propeller blade the leading and trailing edge members 1 and 2, respectively, are forged to a substantially V-shaped cross section, the leading edge member being more blunt than the trailing edge member. The thrust and camber foils 3 and 4, respectively, are forged from plate stock and then electric flash welded to the respective edges of the leading and trailing edge members 1 and 2. These parts are usually constructed of expensive alloy material selected for its physical properties.

In the forging of members 1 and 2 a series of spaced projections 5 are formed at the peak on the back side thereof. Extensions 6 are then welded to the projections 5. The members 1 and 2, illustrated, each have four projections spaced apart longitudinally thereof.

In electric flash welding members 1 and 2 to the respective foils 3 and 4, the extensions 6 serve to hold the members in the welding dies and prevent warping of the members.

Referring to Fig. 3, each edge member 1 and 2 is mounted in a welding electrode 7 having a contoured recess in its face for receiving the same, and the extensions 6 protrude through the openings in the dies. The extensions 6 have their ends threaded and nuts 8 secure the members in the dies.

The foils 3 and 4 are suitably clamped in spaced relation and the two foils are welded to the trailing edge member 2 at one time. Then the two foils are similarly welded to the leading edge member 1.

After welding and removal of the welding electrodes, the projections 5 and their extensions 6 are cut away and the leading and trailing edges ground to smoothen the same at the location of the projections. The welding flash is likewise cut away and the section ground to contour at the welds.

By forging the projections 5 upon the leading and trailing edge members 1 and 2 the weld which joins the extensions 6 to the members is suitably spaced from the body of the members to avoid any possible injury to or contamination of the metal of the body portion, as might occur were the extensions 6 welded directly to the body of the members. In later removal of the projections, it is unnecessary to disturb the metal of the members, and the latter is maintained uniform for the full extent of the edges of the blade. This is particularly important where the parts being welded are of expensive alloy material which might be effected by the welding of lugs to it.

Various embodiments of the invention may be employed within the scope of the claims.

I claim:

1. In the electric flash welding of a generally V-shaped edge piece to a foil in the construction of an airplane propeller, the steps of forging temporary integral projections on the peak of the edge piece and spaced apart longitudinally thereof, securing extensions to said projections, placing the piece in a welding electrode which confines the same with a wedging action and with the longitudinal edges exposed for welding, securing the extensions to the electrode to prevent movement of the piece relative to the electrode during welding, electric flash welding a foil to an edge of the piece, thereafter removing the piece from the electrode, and then permanently removing the projections from said edge piece.

2. A work piece for electric butt welding to a member along an edge of substantial length, the shape of the work piece being unstable to the stresses resulting from the thermal expansion of an edge portion during welding, comprising a forged body portion having an edge projecting forwardly therefrom for welding, an integrally forged projection thereon extending in a direction different from that of the welding edge portion and located intermediate the ends thereof, and an extension welded to said projection at a weld line substantially removed from said body portion for securing the same in a welding die, said projection and extension being subject to removal from the work piece after the welding operation.

3. A forged V-shaped propeller blade edge piece adapted to be flash welded at its inner edges to foil plates or the like and having one or more integrally forged projections on its outer apex, and extensions welded to said projections for securing the piece in a welding die, the weld line between said extensions and said projections being removed from the body of the piece, and said projections being adapted to be removed from the piece after the flash welding operations referred to.

WILLIAM C. HEATH.